United States Patent
Minadeo

(10) Patent No.: US 9,200,619 B2
(45) Date of Patent: Dec. 1, 2015

(54) WIND TURBINE YAW OR PITCH BEARING UTILIZING A THREADED BEARING SURFACE

(75) Inventor: Adam Daniel Minadeo, Greenville, SC (US)

(73) Assignee: General Electric Company, Schenectady, NY (US)

( * ) Notice: Subject to any disclaimer, the term of this patent is extended or adjusted under 35 U.S.C. 154(b) by 642 days.

(21) Appl. No.: 13/568,556

(22) Filed: Aug. 7, 2012

(65) Prior Publication Data

US 2014/0044544 A1 Feb. 13, 2014

(51) Int. Cl.
*F03D 11/00* (2006.01)
*F16C 17/10* (2006.01)
*F16C 17/26* (2006.01)

(52) U.S. Cl.
CPC ............ *F03D 11/0008* (2013.01); *F16C 17/10* (2013.01); *F16C 17/26* (2013.01); *F05B 2240/50* (2013.01); *F16C 2226/78* (2013.01); *F16C 2360/31* (2013.01); *Y02E 10/722* (2013.01)

(58) Field of Classification Search
CPC ... F03D 1/0658; F03D 1/0691; F03D 7/0204; F03D 7/0208; F03D 7/0212; F03D 7/0224; F03D 11/0008; F16C 31/02
See application file for complete search history.

(56) References Cited

U.S. PATENT DOCUMENTS

| | | | |
|---|---|---|---|
| 2,510,549 A * | 6/1950 | Buchi | 384/398 |
| 4,798,481 A | 1/1989 | Frank | |
| 6,276,884 B1 | 8/2001 | Bueter | |
| 7,186,083 B2 * | 3/2007 | Bayly | 416/51 |
| 7,703,985 B2 | 4/2010 | Olsen | |
| 7,967,511 B2 | 6/2011 | Aida | |
| 8,164,211 B2 | 4/2012 | Numajiri | |
| 2010/0135607 A1 * | 6/2010 | Rogall et al. | 384/477 |
| 2011/0115233 A1 | 5/2011 | Schröppel | |
| 2012/0141267 A1 * | 6/2012 | Kang | 416/1 |

FOREIGN PATENT DOCUMENTS

DE 102005039434 A1 * 2/2007
WO WO 2007/062123 5/2007

OTHER PUBLICATIONS

English Translation of DE 102005039434A1 Description, Feb. 19, 2015, EPO.*

* cited by examiner

*Primary Examiner* — Dwayne J White
*Assistant Examiner* — Adam W Brown
(74) *Attorney, Agent, or Firm* — Dority & Manning, P.A.

(57) ABSTRACT

A yaw or pitch bearing for a wind turbine includes a slewing ring bearing assembly having an outer race and an inner race, both having an inner surface and an outer surface. The inner surface of the outer race and the outer surface of the inner race have a plurality of threads that engage and define a threaded bearing surface.

16 Claims, 5 Drawing Sheets

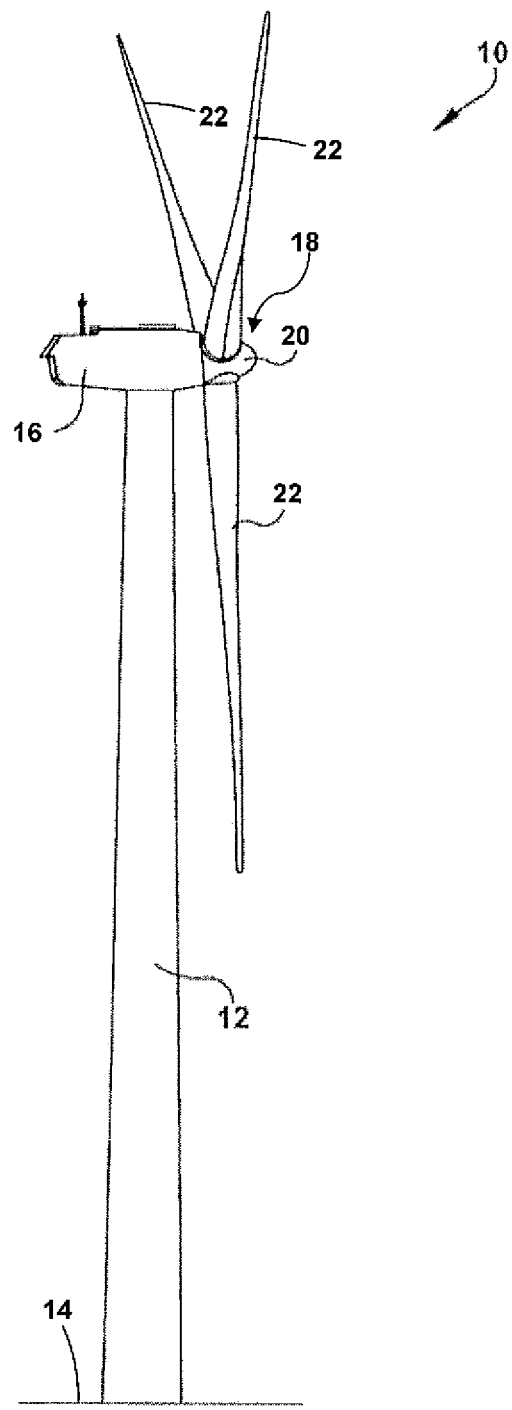
FIG. -1-

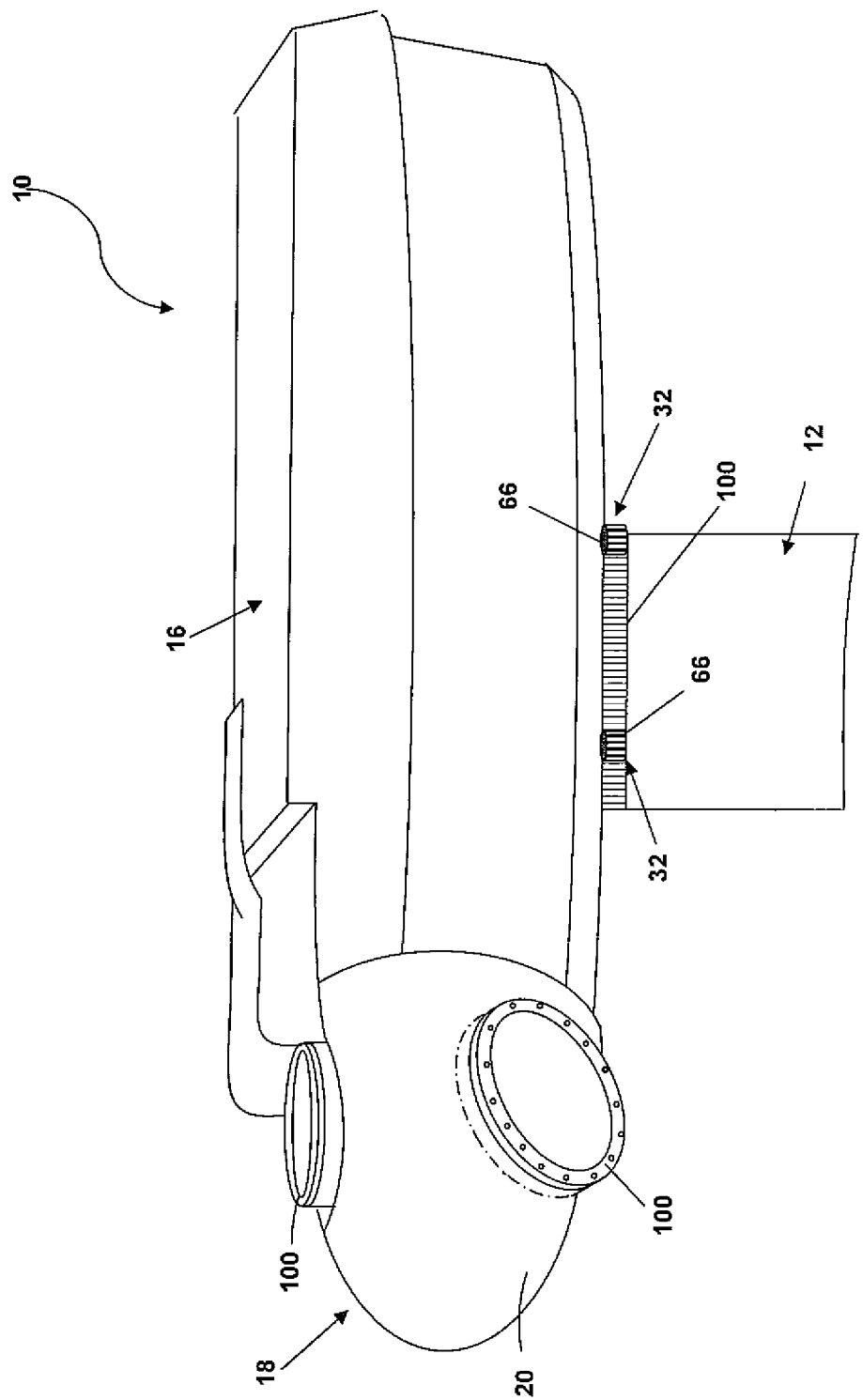
FIG. -2-

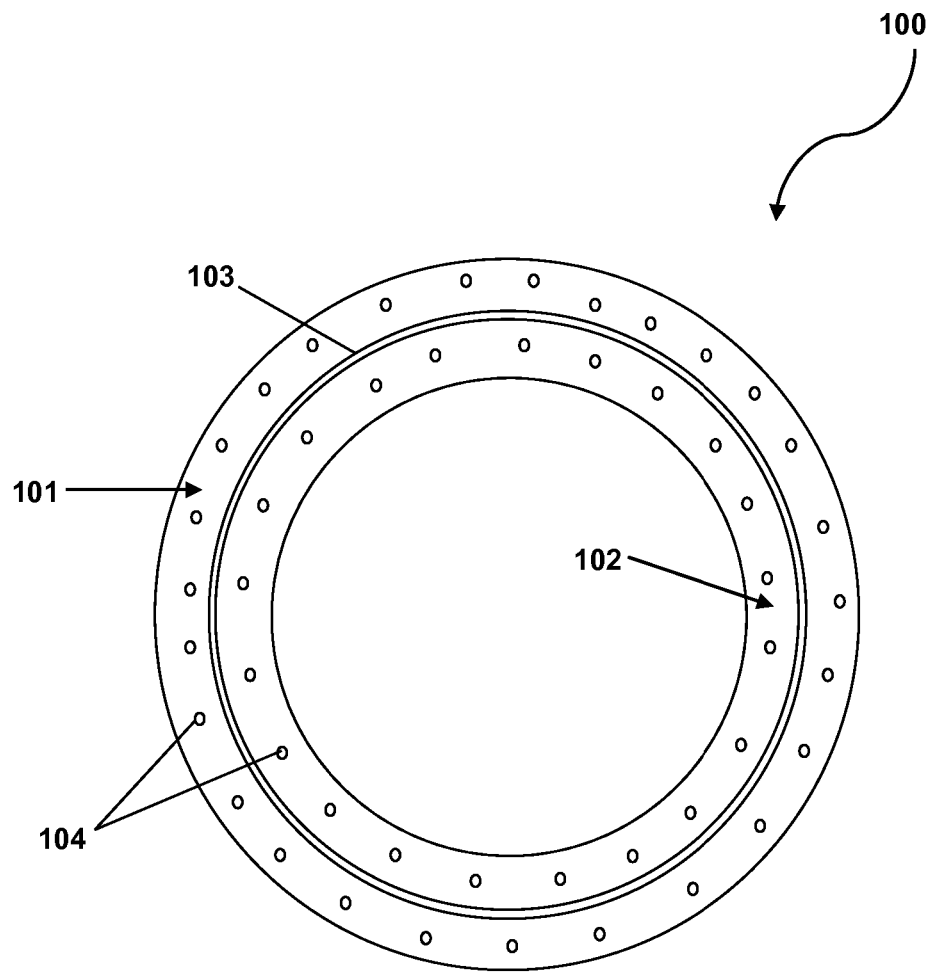
FIG. -3-

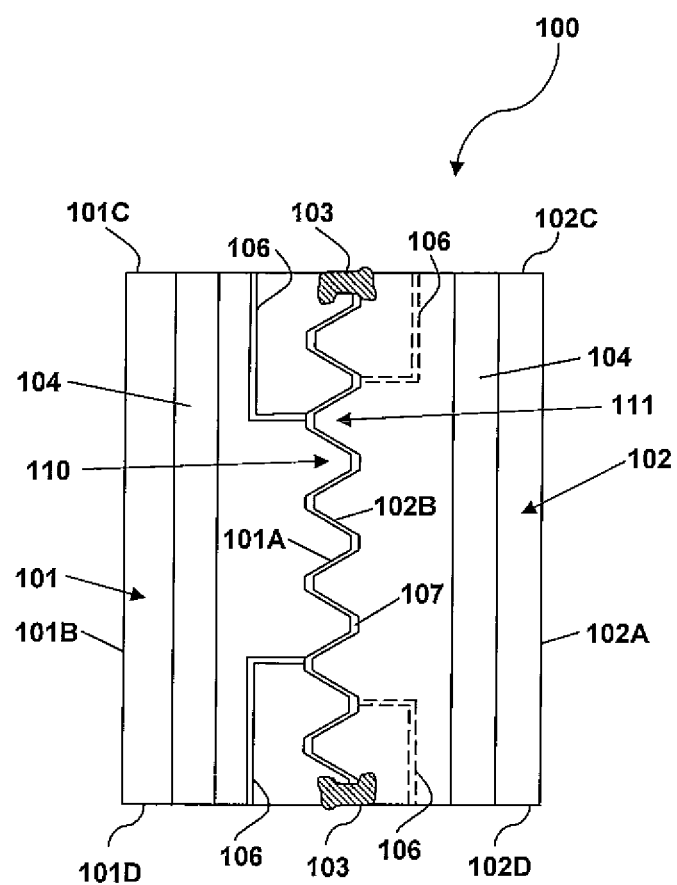
FIG. -4-

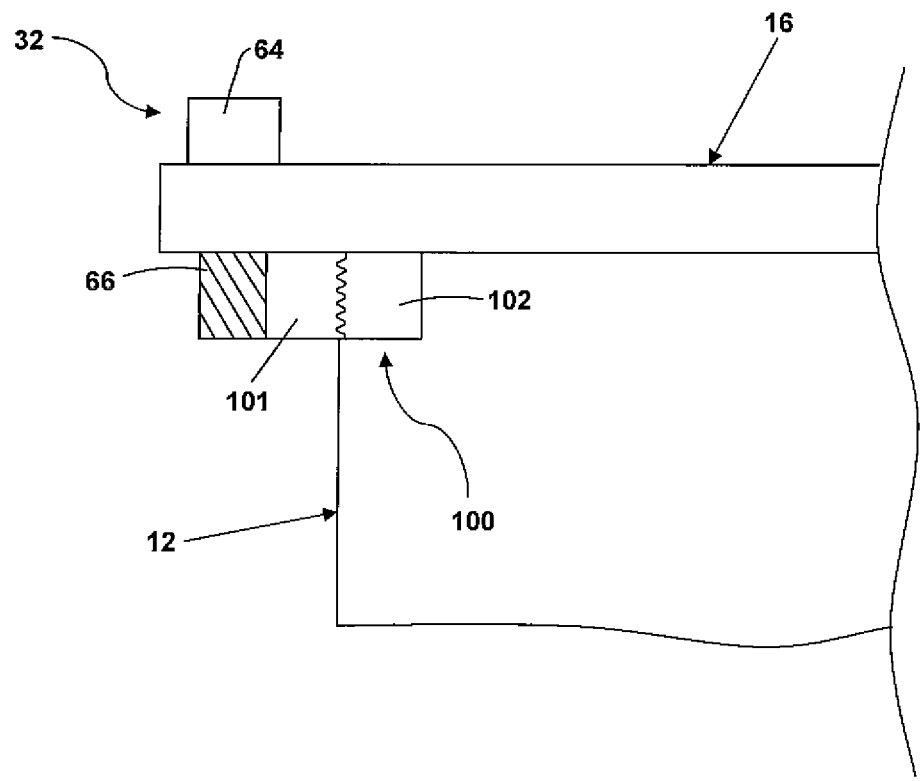
FIG. -5-

WIND TURBINE YAW OR PITCH BEARING UTILIZING A THREADED BEARING SURFACE

FIELD OF THE INVENTION

The present invention relates generally to yaw or pitch bearings for wind turbines, and more particularly to yaw or pitch bearings having a threaded bearing surface.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

To properly orient the nacelle and the rotor blades relative to the direction of the wind, wind turbines typically include one or more yaw and pitch bearings. Yaw bearings permit rotation of the nacelle and are mounted between the tower and the nacelle. Pitch bearings permit rotation of the rotor blades and are mounted between the rotatable hub and a rotor blade. Typically, yaw and pitch bearings are slewing ring bearings that include an outer race and an inner race with a plurality of ball bearings between the races. In the case of yaw bearings, there may be a flat wear surface between washer-like raceways for supporting the loads while allowing the nacelle to yaw. One or more drive mechanisms are configured to drive the slewing ring bearings.

As wind turbines continue to increase in size, these slewing ring bearings must similarly increase in size due to increased loading. In order for a slewing ring bearing to withstand such loading, it must include various components that can adequately react to the increased loads. Thus, for example, two, three, or more rows of bearing balls may be included in a slewing ring bearing. However, such increase in the number and rows of bearing balls may be prohibitively expensive.

Additionally, increasing the size of a slewing ring bearing may result in increased load peaks. This is because the loads that the slewing ring bearing is subjected to are reacted over concentrated areas of the bearing. Load peaking describes load distribution, such as between the various balls of a bearing. A high load peak means that the load on the most highly loaded component, such as a bearing ball, is higher than the average load on all components. More efficient load transfer is thus obtained when load peaks are reduced. Thus, the slewing ring bearings of larger wind turbines must account for such increased load peaks.

Accordingly, a wind turbine with an improved slewing ring bearing would be desired in the art. For example, a slewing ring bearing that does not use ball or slide bearings yet provides improved distribution of loads and cost savings would be advantageous.

BRIEF DESCRIPTION OF THE INVENTION

Aspects and advantages of the invention will be set forth in part in the following description, or may be obvious from the description, or may be learned through practice of the invention.

In one embodiment, a slewing ring bearing assembly for a wind turbine is disclosed. The slewing ring bearing assembly includes an outer race and an inner race. The inner surface of the outer race and the outer surface of the inner race include a plurality of threads that are engaged and thereby form a threaded bearing surface. This configuration provides an increased load capacity without forcing mating components to become larger and more costly. In addition, one bearing assembly size can handle a wide range of blade sizes (for a pitch bearing embodiment), thereby providing for in-field upgrades without the necessity for new bearing and mating components.

In one embodiment of the invention, the threads on the inner surface of the outer race and the threads on the outer surface of the inner race may have the same pitch. In yet another embodiment, the threads may be various shapes including square, triangular, rectangular, quadrilateral, trapezoidal, or similar.

In another embodiment, the slewing ring bearing may be configured as a component of a yaw bearing operably between a tower and a nacelle, or as a component of a pitch bearing between a rotatable hub and a rotor blade of a wind turbine.

In a further embodiment, the slewing ring bearing assembly may also include at least one or more lubricant inlets defined in the inner and/or outer race to introduce a lubricant into the threaded bearing surface of the slewing ring bearing for a variety of reasons, including reducing friction and associated wear between the threads, protecting the slewing ring bearing from corrosion, and reducing operating noise. The slewing ring bearing may also include at least one seal at the interface between the outer race and the inner race. A seal may be employed in the slewing ring bearing for a variety of reasons, including protecting the threaded bearing surface from normal debris penetration and/or prohibiting a lubricant from leaking.

Further aspects of the invention encompass a wind turbine having a tower, a nacelle, and a slewing ring bearing assembly operably configured between the tower and nacelle as a component of a yaw bearing. The slewing ring bearing assembly may be configured in accordance with any one of the embodiments set forth above.

Still further aspects of the invention encompass a wind turbine having a nacelle, a rotor with a rotatable hub and at least rotor blade, and a slewing ring bearing assembly operably configured as a component of a pitch bearing between the rotor blade and hub. The slewing ring bearing assembly may be configured in accordance with any one of the embodiments set forth above.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one embodiment of a nacelle and tower of a wind turbine according to the present disclosure;

FIG. 3 illustrates a top view of one embodiment of a slewing ring bearing of a wind turbine according to the present disclosure.

FIG. 4 illustrates a cross-sectional side view of one embodiment of a slewing ring bearing of a wind turbine according to the present disclosure.

FIG. 5 illustrates a side view of one embodiment of a slewing ring drive mechanism coupled with a slewing ring bearing according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring to the drawings, FIG. 1 illustrates a perspective view of one embodiment of a wind turbine 10. As shown, the wind turbine 10 includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to the nacelle 16, which encloses an electric generator (not shown) to permit electrical energy to be produced.

FIG. 2 shows a simplified view of one embodiment of the nacelle 16 of the wind turbine 10. A slewing ring bearing assembly 100 is operably configured between the tower 12 and nacelle 16. Further, the rotor 18 is coupled to a drive train (not shown) within the nacelle 16. The rotor 18 includes the rotatable hub 20 and at least one rotor blade 22 (FIG. 1). A slewing ring bearing assembly 100 of the present invention may also be configured operably between the rotatable hub 20 and respective rotor blades 22 (FIG. 1). For example, in the illustrated embodiment, the rotor 18 includes two slewing ring bearing assemblies 100 wherein a rotor blade 22 may be affixed.

The wind turbine 10 may also include one or more slewing ring drive mechanisms 32 configured with each the slewing ring bearing assemblies 100. As shown in FIG. 2, a drive mechanism 32 is engaged with the slewing ring bearing assembly 100 coupled between the tower 12 and the nacelle 16 as a component of a controllable yaw bearing. It should also be understood that a slewing ring drive mechanism may be configured to the slewing ring bearing assembly 100 that is coupled between the rotatable hub 20 and a respective blade 16 as a component of a controllable pitch bearing. Any manner of suitable drive mechanism may be employed. For example, each slewing ring drive mechanism 32 may include a slewing ring motor 64 (FIG. 5) coupled to the slewing ring gear 66, with the gear 66 configured to engage one of the races of the slewing ring bearing assembly 100. Greater detail regarding an exemplary embodiment of a slewing ring drive mechanism 32 is disclosed below in the description of FIG. 5.

During operation of the wind turbine 10, the slewing ring bearing assembly 100 permits rotation in various locations. For example, the slewing ring bearing assembly 100 may permit rotation of the nacelle 16 about the tower 12 and/or to control and vary the pitch of the rotor blades 22. Such rotation allows the wind turbine 10 to maximize wind capture efficiency and maintain rotor speed within operating limits as the wind speed changes. The present disclosure thus provides the improved slewing ring bearing assemblies 100 that provide such rotation without the costs associated with increased size and number of ball bearings and associated ball-bearing rings.

Referring to FIG. 3, a top view of one embodiment of a slewing ring bearing assembly 100 for a wind turbine of the present invention is disclosed. The slewing ring bearing assembly 100 includes an outer race 101 and an inner race 102. The outer race 101 is circumferentially engaged with the inner race 102. In exemplary embodiments, the inner race 102 of the slewing ring bearing assembly 100 may be rotatable with respect to the outer race 101. Alternatively, however, the outer race 101 may be rotatable with respect to the inner race 102, or both races 101, 102 may be rotatable. The outer race 101 may be a segmented component that is assembled around the inner race. Other suitable slewing ring assembly techniques are within the scope and spirit of the invention.

It should be appreciated that the outer race may, in certain embodiments, be an integral part of another component, and need not be a separate ring component. For example, the load capacity of the bearing assembly may be so high and resulting stresses so low that the outer race may be machined directly into the hub 20.

Further, the slewing ring bearing assembly 100 may include a seal 103 at the interface of the inner race 102 and outer race 101. A separate seal 103 may be provided at both axial faces of the slewing ring bearing assembly 100. Greater detail regarding the seal 103 is disclosed below in the description of FIG. 4. FIG. 3 also discloses a plurality of mounting holes 104 on the outer race 101 and the inner race 102 for mounting the respective components to a wind turbine structure, such as the nacelle frame, tower, hub, or blades.

Referring to FIG. 4, a cross-sectional side view of one embodiment of a slewing ring bearing assembly 100 of the present invention is disclosed. The bearing assembly 100 includes an outer race 101 and an inner race 102. The inner race 102 is engaged with the outer race 101 via a threaded bearing surface 107 defined between the components. In particular, the outer race 101 includes an inner circumferential surface 101A and an outer circumferential surface 101B. The inner surface 101A includes a plurality of threads 110. The inner race 102 has an inner circumferential surface 102A and an outer circumferential surface 102B. The outer surface 102B of the inner race 102 includes a plurality of threads 111. The threads 110 and threads 111 engage or interconnect to form the threaded bearing surface 107.

The threads 110, 111 may be machined into the respective race surfaces in one embodiment, or may be provided as a separate element that is affixed to the race surfaces. It should be understood that the invention is not limited to any particular number of configuration of the threads 110, 111. A greater number of threads provides increased load surfaces and, thus, may be desired for load distribution purposes. This advantage must be weighed, however, against the machining costs, tool wear, and other structural complexities associated with a greater number of threads.

It should also be understood that the "threads" encompass any suitable peaks-and-valley engaging structure. In one embodiment, the threads 110 on the inner surface 101A of the outer race 101 and the threads 111 on the outer surface 102B of the inner race 102 have the same pitch. Further, the threads 110/111 may be various shapes. For example, in the illustrated embodiment, the threads have a trapezoidal shape. However, it should be understood that the threads may have any appropriate shape, including square, triangular, rectangular, quadrilateral, buttress, or similar shape.

The threads 110, 111 are, in one embodiment, defined as individual concentric members such that relative rotation of the races 101, 102 does not produce axial displacement of the respective races 101, 102. However, other embodiments may include a continuous spiral thread configuration. With this configuration, and based on thread pitch and the oscillatory movement of the components, the races will only move axially a few millimeters relative to each other.

As mentioned previously, the slewing ring bearing assembly 100 may include at least one seal 103. In the illustrated embodiment of FIG. 4, the slewing ring bearing assembly 100 includes seals, 103A, 103B at each of the axial faces of the bearing assembly 100. A seal 103 may be employed in the slewing ring bearing assembly 100 for a variety of reasons, including protecting the threaded bearing surface 107 from normal debris penetration and prohibiting a lubricant from leaking. Further, the seal 103 may be configured in various locations including, between the top surfaces 101C/102C of the outer race 101 and the inner race 102 and/or between the bottom surfaces 101D/102D of the outer race 101 and the inner race 102. The seal 103 may be made of any suitable material with appropriate sealing characteristics and the ability to withstand rotational and translational wear, including acrylonitrile-butadiene rubber, hydrogenated acrylonitrile-butadiene rubber, fluoro-rubber, polyurethane, or similar material.

In another embodiment, the slewing ring bearing assembly 100 may include at least one lubricant inlet 106. For example, in the illustrated embodiment of FIG. 4, two lubricant inlets 106 are configured in the outer race 101. The lubricant inlets 106 may also be configured in the inner race 102 (as shown by the dashed lines), or any combination thereof. The lubricant inlets 106 may be L-shaped (as shown) or any shape that directs a lubricant from a surface of the slewing ring bearing assembly 100 to the threaded bearing surface 107. Centrifugal grooves may also be used to transport lubricant to the threaded surfaces of the races.

Referring to FIG. 5, one embodiment of a slewing ring drive mechanism 32 coupled with the slewing ring bearing assembly 100 is disclosed. One or more slewing ring drive mechanisms 32 may be employed in the present invention to drive the slewing ring bearings 100. The slewing ring drive mechanism 32 may be connected to the slewing ring bearing assembly 100 and may be configured to drive the bearing. The slewing ring drive mechanism 32 may have any suitable configuration and may include any suitable components known in the art that allow such mechanisms 32 to function as described herein. For example, as shown in FIG. 5, each slewing ring drive mechanism 32 may include a slewing ring motor 64. The slewing ring motor 64 may be coupled to a slewing ring gear 66 (e.g., a pinion gear) configured to engage the slewing ring bearing assembly 100, such as the outer race 101 (as shown) or the inner race 102. For instance, the slewing ring motor 64 may be coupled to the slewing ring gear 66 directly (e.g. by an output shaft (not shown)) or indirectly through a suitable gear assembly coupled between the slewing ring motor 64 and the slewing ring gear 66. As such, the torque generated by the slewing ring motor 64 may be transmitted through the slewing ring gear 66 and applied to the slewing ring bearing assembly 100 to permit rotation of either the nacelle 16 about the tower 12 and/or the rotor blades 22 relative to the hub 20. The slewing ring gear 66 and the outer race 101 as shown or the inner race 102 may include mating teeth, threads, or splines, and mating thereof may provide such engagement and connection as discussed.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A slewing ring bearing assembly for a wind turbine yaw or pitch bearing, comprising:
   a ring-shaped outer race comprising opposing annular top and bottom surfaces, and an inner circumferential surface, the top surface of the outer race configured for attachment to at least one of a rotor blade, a hub, or a nacelle of the wind turbine, the inner circumferential surface of the outer race comprising a plurality of threads;
   a ring-shaped inner race comprising opposing annular top and bottom surface, an inner circumferential surface and an outer circumferential surface, the top surface of the inner race configured for attachment to at least one of a tower, a rotor blade, or a hub of the wind turbine, the outer circumferential surface of the inner race comprising a plurality of threads; wherein the threads on the inner circumferential surface of the outer race and the threads on the outer circumferential surface of the inner race interconnect to form a threaded bearing surface;
   a lubricant configured to lubricate the threaded bearing surface during operation; and
   at least one seal configured at an interface between the outer inner races, the at least one seal configured to prevent the lubricant from leukin from the slewing ring bearing.

2. The stewing ring bearing assembly of claim 1, wherein the threads on the inner circumferential surface of the outer race and the threads on the outer circumferential surface of the inner race have the same pitch.

3. The Mewing ring bearing assembly of claim 1, wherein the slewing ring bearing assembly is coupled between a tower and a nacelle of a wind turbine.

4. The slewing ring bearing assembly of claim 1, wherein the slewing ring bearing assembly is coupled between a rotatable hub and a rotor blade of a wind turbine.

5. The slewing ring bearing assembly of claim 1, further comprising at least one lubricant inlet in at least one of the inner race or the outer race, the at least one lubricant inlet configured to deliver the lubricant to the threaded bearing surface.

6. The slewing ring bearing of claim 1, wherein the threads on inner circumferential surface of the outer race and the threads on the outer circumferential surface of the inner race comprise at least one of a square, triangular, rectangular, quadrilateral, and trapezoidal shape.

7. A wind turbine, comprising:
a tower;
a nacelle, the nacelle comprising a main frame; and
a slewing ring bearing assembly configured on top of the tower operably between the tower and the main frame, the slewing ring bearing comprising:
 a ring-shaped outer race comprising opposing annular top and bottom surfaces, and an inner circumferential surface with a plurality of threads;
 a ring-shaped outer race comprising opposing annular top and bottom surfaces, and an outer circumferential surface comprising a plurality of threads;
wherein the threads on the inner circumferential surface of the outer race and the threads on the outer circumferential surface of the inner race engage to form a threaded bearing surface;
 a lubricant configured to lubricate the threaded bearing surface during operation; and
 at least one seal configured at an interface between the outer and inner races, the at least one seal configured to prevent the lubricant from leaking from the slewing ring bearing.

8. The wind turbine of claim 7, wherein the threads on the inner circumferential surface of the outer race and the threads on the outer circumferential surface of the inner race have the same pitch.

9. The wind turbine of claim 7, further comprising at least one lubricant inlet in the inner race or outer race configured to deliver a lubricant to the threaded bearing surface.

10. The wind turbine of claim 7, wherein the threads on the inner circumferential surface of the outer race and the threads on outer circumferential surface of the inner race comprise at least one of a square, triangular, rectangular, quadrilateral, and trapezoidal shape.

11. The wind turbine of claim 7, further comprising a slewing ring drive mechanism configured to drive the slewing ring bearing assembly.

12. A wind turbine, comprising:
a nacelle;
a rotor, the rotor comprising a rotatable hub and at least one rotor blade; and
a slewing ring bearing assembly operably configured between the rotatable hub and the rotor blade, the slewing ring bearing assembly comprising:
 a ring-shaped outer race comprising opposing annular top and bottom surfaces, and an inner circumferential surface with a plurality of threads;
 a ring-shaped inner race comprising annular top and bottom surfaces, and an outer circumferential surface comprising a plurality of threads;
wherein the threads on the inner circumferential surface of the outer race and the threads on the outer circumferential surface of the inner race engage to form a threaded bearing surface;
 a lubricant configured to lubricate the threaded bearing surface during operation; and
 at least one seal configured at an interface between the outer and inner races, the at least one seal configured to prevent the lubricant from leaking from the slewing ring bearing.

13. The wind turbine of claim 12, wherein the threads on the inner circumferential surface of the outer race and the threads on the outer circumferential surface of the inner race have the same pitch.

14. The wind turbine of claim 12, further comprising at least one lubricant inlet in the outer race or the inner race configured to deliver a lubricant to the threaded bearing surface.

15. The wind turbine of claim 12, wherein the threads comprise at least one of a square, triangular, rectangular, quadrilateral, and trapezoidal shape.

16. The wind turbine of claim 12, further comprising a slewing ring drive mechanism configured to drive the slewing ring bearing assembly.

* * * * *